Figure 1A:
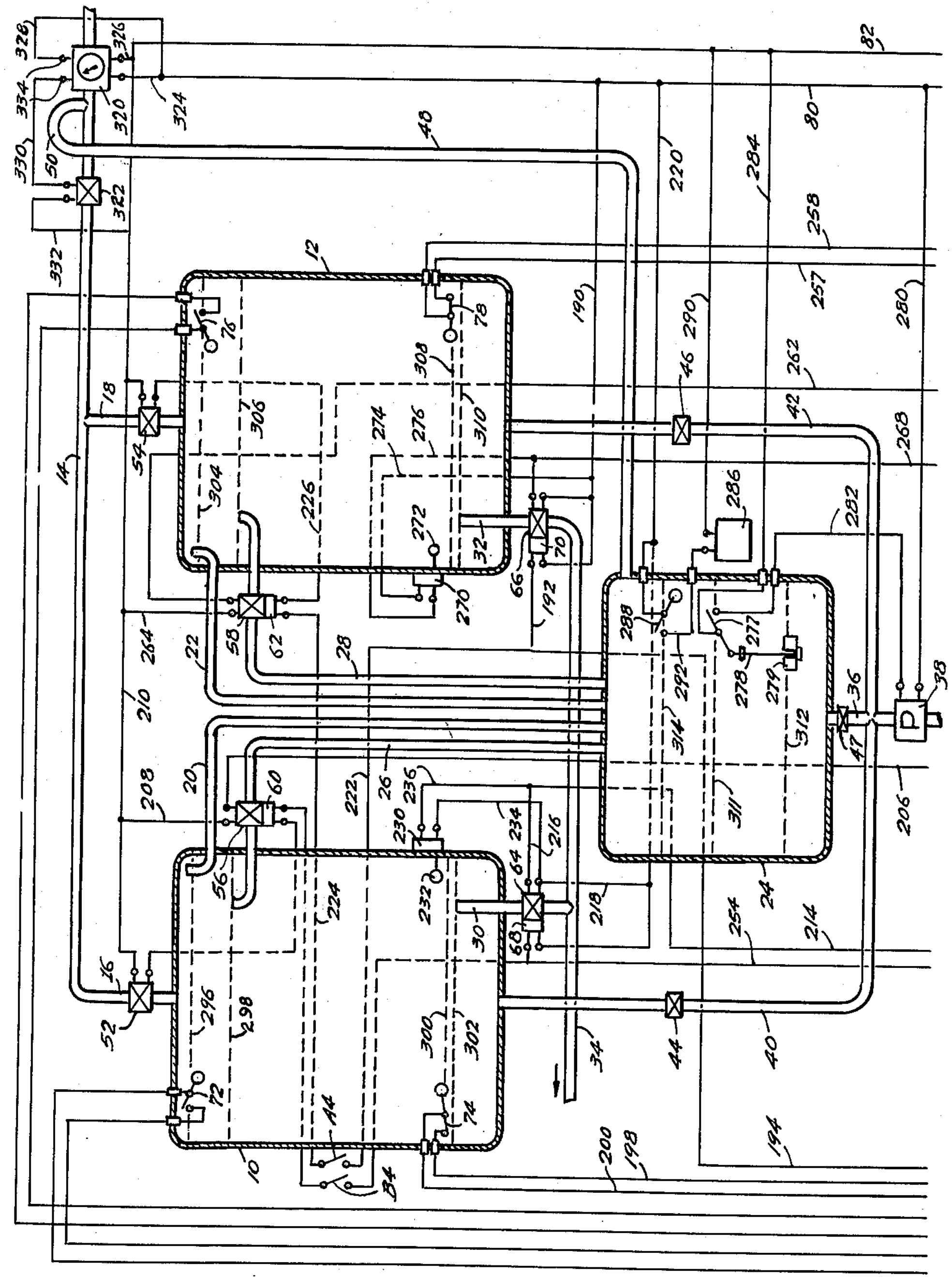

April 4, 1961 S. H. POPE ET AL 2,977,796

AUTOMATIC LIQUID MEASUREMENT

Filed June 25, 1956

2 Sheets-Sheet 1

INVENTORS.
Samuel H Pope and
Ross M. Stuntz Jr. Deceased.
By Esther W. Stuntz, Executrix.

BY [signature]
ATTORNEY

April 4, 1961 S. H. POPE ET AL 2,977,796
AUTOMATIC LIQUID MEASUREMENT
Filed June 25, 1956 2 Sheets-Sheet 2
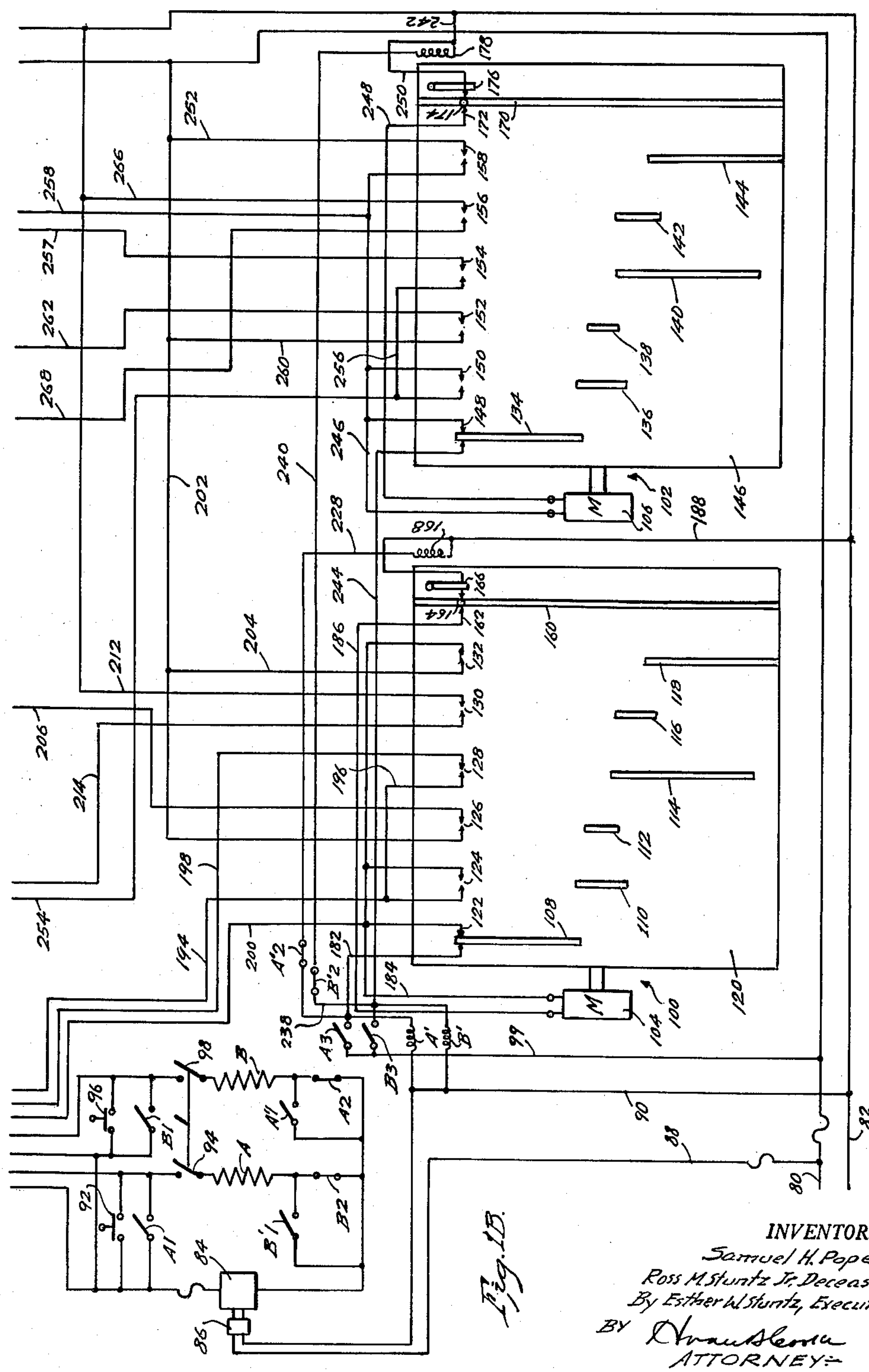
INVENTORS.
Samuel H. Pope and
Ross M. Stuntz Jr., Deceased,
By Esther W. Stuntz, Executrix.
BY [signature]
ATTORNEY

United States Patent Office 2,977,796

Patented Apr. 4, 1961

2,977,796

AUTOMATIC LIQUID MEASUREMENT

Samuel H. Pope, Tulsa, Okla., and Ross M. Stuntz, Jr., deceased, late of Tulsa, Okla., by Esther W. Stuntz, executrix, Tulsa, Okla., assignors to Gulf Oil Corporation, Pittsburgh, Pa., a corporation of Pennsylvania Filed June 25, 1956, Ser. No. 593,762

30 Claims. (Cl. 73—219)

This invention relates to a process of and apparatus for measuring a liquid, and is closely related to our copending and correspondingly assigned application Serial No. 493,123, filed March 9, 1955, entitled "Liquid Measurement," now Patent No. 2,914,946.

This invention relates in general to a process of and apparatus for controlling and timing with respect to a measuring vessel the cyclic performance of the sequential operations of filling of such vessel to a predetermined upper level, allowing the liquid to settle or stand in the vessel for a predetermined minimum time interval, then withdrawing a sufficient quantity of liquid from the vessel until the liquid level therein has been lowered to a predetermined intermediate level, and subsequently draining from the vessel as a measured unit of liquid volume the quantity of liquid necessary to lower the liquid level in the vessel to a predetermined lower level.

Briefly, a broad aspect of the invention involves the process of and apparatus for discharging a sufficient volume of liquid from a vessel to lower the liquid level therein to the level of the inlet of a discharge conduit provided with a valve by maintaining the valve open until the liquid level in the vessel is spaced a short predetermined height above the level of the inlet, and thereafter maintaining the valve open for a predetermined time interval that is known to be at least sufficient for the liquid level to be lowered the predetermined height to the level of the inlet.

The preferred form of apparatus for performing this sequence of operations involves the use of an electrical timer controlling an electrically operated discharge valve. The electrical circuit is such that the electrical timer is deenergized in a position causing the drain valve to be open until the liquid level is a predetermined height above the level of the inlet of the discharge, with the timer being thereafter energized and causing the drain valve to be maintained open for a predetermined time interval.

Another aspect of the invention involves the coordinated use of two measuring vessels, the arrangement being such that the vessels will alternately discharge measured unit volumes of liquid in a manner somewhat analogous to and for similar purposes as the disclosure of our previously mentioned copending application.

The invention encompasses electrically interlocking the electrical timers of the two vessels, so that liquid to be measured can be introduced only into one of the two vessels at a time, and also so that only one of such vessels can be discharging its measured unit of liquid volume at one time.

The invention will be most readily understood upon reference to the accompanying drawing. The latter, for purposes of clarity, has been divided and is presented upon two sheets as Figures 1A and 1B. The drawing is a schematic representation of a preferred embodiment of the invention and certain portions thereof, in particular the electrical control elements, have been greatly enlarged in size so that the interrelation of various components may be readily apparent. A more detailed explanation of the schemes of representation employed in the drawing will be given hereinafter in connection with the detailed description of the apparatus.

Referring to the drawing, the numerals 10 and 12 designate two measuring vessels which receive liquid from a common source by means of a common conduit 14, the latter being provided with lateral branches 16 and 18 that open into the top of the vessels 10 and 12, respectively.

The vessels 10 and 12 are respectively provided with overflow conduits 20 and 22 that have their inlet ends disposed adjacent the upper part of their respective vessels, and which discharge by gravity flow into a reservoir vessel or surge tank 24. The tank 24 and vessels 10 and 12 can, if desired, be provided with conventional breathers, not shown.

The vessels 10 and 12 are respectively provided with downdraw conduits 26 and 28, such conduits having their inlet ends disposed within their respective vessels in vertically spaced relation below the inlet ends of their associated overflow conduits, with the downdraw conduits being arranged to discharge by gravity flow into the reservoir 24.

The vessels 10 and 12 are respectively provided with discharge conduits 30 and 32 which have their inlet ends spaced above the bottom of their respective vessels and which are connected to discharge into a common discharge conduit 34.

Means are provided for cleaning out and/or entirely emptying the vessels 10 and 12 and the reservior 24. Such means include the drain conduit 36 being connected to the bottom of the reservoir 24, such drain conduit 36 being provided with an electrically actuated pump 38. The vessels 10 and 12 are respectively provided with drain conduits 40 and 42 that are connected between the bottoms of their respective vessels and the drain conduit 36 intermediate the reservoir 24 and the pump 38. The drain conduits 40 and 42 are respectively provided with valves 44 and 46, which valves can, if desired, be provided with conventional locking means, not shown, so that such valves can only be opened by authorized personnel. A valve 47 is provided in the conduit 36 so that by appropriate use of valves 44, 46 and 47, liquids can be selectively removed from either of the vessels 10 and 12 without removing liquid from the reservoir 24.

Additional conduit means, not shown, can be provided for connecting the drain conduit 36 to whatever treating equipment may be required in order to process the liquid for reintroduction into the measuring apparatus through conduit 14.

A by-pass conduit 48 is connected between the conduit 14 and the reservoir 24 for diverting liquids into the reservoir 24 whenever the flow of liquids into the vessels 10 and 12 is prevented. As will be seen upon reference to the drawing, such diversion of liquid flow will not normally occur as the conduit 48 extends upwardly from the conduit 14 as a gooseneck 50.

The above-described conduit system of this embodiment of the invention is provided with a system of conventional electrically controlled or actuated valves, some of which valves are coupled to electric switches which are closed when the valves are closed and vice versa.

Such valving system includes valves 52 and 54 disposed in the branch conduits 16 and 18 for controlling the introduction of liquids into the vessels 10 and 12. The valves 52 and 54 are of conventional character and are of the type which are open during electrical energization and are normally closed.

Valves 56 and 58, which are similar to valves 52 and 54 are respectively disposed in the downdraw conduits 26 and 28. These valves are respectively coupled in a conventional manner to electrical switches 60 and 62 that open and close along with the opening and closing of their respective valves. Similarly, discharge valves 64 and 66 are disposed in the discharge conduits 30 and 32, respectively. These valves are also equipped in a conventional manner with electric switches 68 and 70, respectively, arranged to open and close along with their respective valves.

An electrical control system is provided for the above-described valve system. Such electrical control system includes electric switches in each of the vessels 10 and 12, respectively, for actuation upon changes in liquid level. Such liquid-level-responsive-electric switches can conveniently take the form of upper and lower float-actuated-electric switches 72 and 74 in vessel 10, and upper and lower float-actuated-electric switches 76 and 78 in vessel 12. The upper switches 72 and 76 are vertically positioned so as to be closed whenever the liquid level is above a level somewhat below the inlet end of the associated overflow conduit, the switches otherwise being open. On the other hand, the lower switches 74 and 78 are vertically positioned so as to be closed whenever the liquid level is below a position somewhat above the inlet end of the associated discharge conduit, the switches otherwise being open.

The numerals 80 and 82 designate fused electric power leads adapted to be connected to a source of alternating electrical energy by conventional switch means, not shown. A continuous source of direct current is provided by a battery 84, such battery being of the conventional storage type and is maintained fully charged by means of a rectifier 86 connected thereto. The rectifier 86 is connected to the leads 80 and 82, respectively, by means of leads 88 and 90.

Arranged in electrical parallel to be energized by the battery 84 is a pair of master relay solenoids designated by the letters A and B, such mode of solenoid designation being adopted for a more ready association of such solenoids with the plurality of relay switches operated thereby, as will be presently explained. The circuit of solenoid A comprises three switches electrically connected to a fused terminal of the battery 84, such switches being arranged in electrical parallel and consisting of the previously described float-operated switch 72, a normally open push buttom start switch 92, and a normally open relay switch A1 that is closed whenever solenoid A is energized. Switch A1 closes substantially instantaneously upon energization of solenoid A, and vice versa. The three switches 72, 92 and A1 are connected in series to a normally closed stop switch 94 that is in turn connected to one terminal of the solenoid A. The other terminal of solenoid A is connected to the other terminal of the battery 84 by two parallel electrical paths, one of which includes a relay switch B'1 while the other path includes a relay switch B2.

Switch B'1 is normally open and, as will be explained presently, is arranged to be closed in an indirect manner in response to solenoid B being energized. An arrangement to be subsequently described causes switch B'1 to remain open for a short predetermined time interval after solenoid B is initially energized and remain closed for a short predetermined time interval after solenoid B becomes de-energized, such time intervals being on the order of say about 0.1 second. Switch B2 opens substantially instantaneously upon energization of solenoid B and vice versa.

The circuit of solenoid B comprises three switches electrically connected to the fused terminal of the battery 84, such switches being arranged in electrical parallel and consisting of the previously described float-operated switch 76, a normally open push button start switch 96, and a normally open relay switch B1 that is closed whenever solenoid B is energized. Switch B1 closes substantially simultaneously upon energization of solenoid B and vice versa. The three switches 76, 96, and B1 are connected in series to a normally closed stop switch 98 that is in turn connected to one terminal of the solenoid B. Switches 94 and 98 are preferably mechanically coupled for joint manual operation, as shown. The other terminal of solenoid B is connected to the other terminal of the battery 84 by two parallel electrical paths, one of which includes relay switch A'1, while the other path includes a relay switch A2.

Switch A'1 is normally open and is, as will be explained presently, arranged to be closed in an indirect manner in response to solenoid A being energized. As in the case of switch B'1, an arrangement to be subsequently described, causes switch A'1 to remain open for a short predetermined time interval after solenoid A is initially energized and remain closed for a predetermined time interval after solenoid A becomes de-energized, such time intervals being on the order of 0.1 second. Switch A2 opens substantially instantaneously upon energization of solenoid A and vice versa.

The means provided for the above-described delayed operation of switch A'1 comprises a relay solenoid A' connected in series with a normally open relay switch A3 between the power leads 80 and 82 by means of leads 90 and 99. The switch A3, like switch A1, is arranged to be closed substantially simultaneously upon energization of solenoid A and vice versa. The solenoid A' together with the switch A'1 and a normally closed switch A'2 comprise a time-delay relay assembly of conventional character. It will be noted that solenoid A' is energized substantially concurrently with energization of solenoid A because of the operation of switch A3. Switch A'2 operates reversely with respect to switch A'1, that is, switch A'2 opens a predetermined time interval, say on the order of 0.1 second or more, after energization of solenoid A', and closes a corresponding time interval after de-energization of solenoid A'.

A further solenoid B' is connected in series with a normally open relay switch B3 between the power leads 80 and 82 by means of the leads 90 and 99. Switch B3, like switch B1, is arranged to be closed substantially concurrently with the energization of solenoid B. The solenoid B' together with relay switch B'1 and a further normally closed relay switch B'2 constitute a time-delay relay assembly, with the relay switches B'1 and B'2 arranged to be reversely operating and actuated by solenoid B'.

From the foregoing, it will be seen that the solenoids A and B are electrically interlocked. The character of such interlocking will be appreciated upon assuming as an initial condition that both the solenoids A and B are de-energized and that all of the switches 72, 76, 92, 96, A1, A'1, A2, A3, B1, B'1, B2, and B3 are in the positions shown in the drawing and that switches 94 and 98 are closed. Then, upon either of the switches 72 or 92 being closed, the solenoid A will be energized through such closed switch, switch 94 and switch B2 by the battery 84. Upon such energization of solenoid A, switch A1 will close substantially instantaneously so that whichever of the switches, either switches 72 or 92, that was initially closed can then be opened without de-energizing solenoid A. Also, upon energization of solenoid A, switches A2 and A3 are opened and closed substantially simultaneously, respectively, with the closure of switch A1, and a short predetermined time interval after the opening of switch A2, the switch A'1 is closed, due to the closure of switch A3 and energization of solenoid A'.

Solenoid A will now remain continuously energized until solenoid B is energized, assuming both switches 72 and 92 to be open with such energization of solenoid B occurring upon closure of either of the switches 76 or 96. Upon closure of either of the latter-mentioned switches, the solenoid B is energized through such closed switch, and switches 98 and A'1 by the battery 84. Substantially simultaneously with the energization of solenoid B, switches B1 and B3 are closed and switch B2 is opened. With closure of switch B1, the continued energization of solenoid B is no longer dependent upon continued closure of either the switches 76 or 96. The opening of switch B2 de-energizes solenoid A with resultant substantially simultaneous opening and closing of switches A1 and A2, respectively. This is followed by the delayed closing of the switch B'1 by solenoid B' and by the delayed opening of the switch A'1 upon de-energization of solenoid A', with the solenoid B thereafter remaining continuously energized through the switch A2 until either of the switches 72 or 92 are closed.

A pair of electrical multiple cam timers are provided in association with the previously described direct and alternating current circuit system and the valving system. Such timers are illustrated diagrammatically in the drawing and are designated generally at 100 and 102. The timers 100 and 102 are identical to each other and can be of the type commercially available from the Industrial Timer Corporation of Newark, New Jersey, with the particular timers illustrated being marketed by such corporation under the designation of model RC11 with a D-12 gear rack. The multiple cam timers 100 and 102 include synchronous motors and suitable reduction gears 104 and 106, respectively, arranged to drive a plurality of cams.

The motor 104 of timer 100 is arranged to rotate a plurality of cams in operative relationship to a plurality of single-pole, double-throw, snap-action switches. The cams of timer 100 are diagrammatically illustrated in the form of conducting segments 108, 110, 112, 114, 116 and 118 raised upon the face of an evolved cylinder 120 of nonconductive material. Each of the single-pole, double-throw, snap-action switches 122, 124, 126, 128, 130 and 132 of the timer 100 is diagrammatically illustrated in the drawing as a pair of contacts arranged to be electrically bridged when the associated electrically conductive cam segment is disposed therebetween. Thus, switch 122 is closed whenever the cam 108 is disposed between the contacts of such switch. With the cams of timer 100 being in the position shown in the drawing, switch 122 is closed, and will remain closed until the motor 104 has rotated cylinder 120 until the entire length of the cam 108 has passed upwardly between the contacts of the switch 122.

The illustration of timer 102 includes cam segments 134, 136, 138, 140, 142 and 144 disposed on the cylinder 146 with such cam segments being operatively associated with switches 148, 150, 152, 154, 156 and 158, respectively.

The timer 100 has a reset mechanism that is normally included in the hereinbefore identified commercially available timer. Such reset mechanism functions to stop timer 100 whenever the latter rotates to the position shown thereof in the drawing and to prevent further operation of the timer until the same has been reset. The resetting mechanism is diagrammatically illustrated as a conducting segment 160 that cooperates with a switch 162 in a manner similar to the hereinbefore described operation of the cam segments and their associated switches. The segment 160 is recessed or notched at 164 so that the switch 162 is open when the timer is in the position shown in the drawing. A pawl 166 is arranged to be moved into a position closing the switch 162 upon energization of a solenoid 168. The arrangement is such that the timer 100 will stop upon the notch 164 becoming juxtaposed with the switch 162 until the solenoid 168 has been momentarily energized, whereupon the timer 100 is free to complete another cycle. The timer 102 is also provided with a reset mechanism, which like the reset mechanism of timer 100 is illustrated as a conducting segment 170, a switch 172, a notch 174 in the segment 170, a pawl 176 and a reset solenoid 178.

A circuit is connected between the power leads 80 and 82 which includes the lead 99, switch A3, lead 182, switch 122, lead 184, motor 104, lead 186, switch 162 and lead 188. The function of this particular circuit is to energize the motor 104 of timer 100 whenever solenoid A is energized and the switches 122 and 162 are closed.

Another circuit is connected between the power leads 80 and 82 that includes a lead 190, the electric switch 70 associated with the valve 66, leads 192 and 194, switch 124, lead 184, motor 104, lead 186, switch 162, and lead 188. The function of this circuit is to energize the motor 104 whenever the valve 66 is closed and the switch 124 is closed by the cam segment 110.

A further circuit is connected between the power leads 80 and 82 that includes lead 190, switch 70, leads 192, 194 and 196, switch 128, lead 198, float switch 74, leads 200 and 184, motor 104, lead 186, switch 162, and lead 188. The function of this circuit is to energize the motor 104 upon the coincidence of the valve 66 being closed, the switch 128 being closed by the cam 114, and the float switch 74 being closed.

Yet another circuit is connected between the power leads 80 and 82 which includes leads 202 and 204, switch 132, lead 184, motor 104, lead 186, switch 162, and lead 188. The function of this circuit is to energize the motor 104 whenever the switch 132 is closed by the cam segment 118.

A downdraw valve circuit is connected between the power leads 80 and 82 which includes the lead 202, switch 126, lead 206, the valve 56, and leads 208 and 210. The function of this circuit is to open the valve 56 whenever the cam segment 112 closes the switch 126.

A discharge valve circuit is connected between the power leads 80 and 82 which includes the lead 212, the switch 130, leads 214 and 216, valve 64, and leads 218 and 220. The function of this circuit is to open the valve 64 whenever the switch 130 is closed by the cam segment 116.

An inlet valve circuit is connected between the leads 80 and 82 which includes the lead 190, the switch 70, leads 192 and 222, a normally open relay switch A4 that is closed during energization of the solenoid A in the same manner as switch A3, lead 224, switch 62, lead 226, valve 54, and lead 210. The function of this circuit is to open the valve 54 upon the coincidence of the valve 66 being closed, solenoid A being energized, and the valve 58 being closed.

The reset solenoid 168 of timer 100 is arranged to be energized for a predetermined time interval following closure of the switch A3 by reason of being connected in series with the switches A3 and A'2 between the power leads 80 and 82. This circuit includes lead 99, switch A3, switch A'2, lead 228, solenoid 168, and lead 188.

The vessel 10 is provided with temperature recording means 230 operative during energization of the discharge valve thereof to record the temperature of the contents of such vessel, with the sensing element 232 thereof being disposed within the vessel 10 above the inlet of the discharge conduit 30. Alternatively, when the apparatus is used for custody transfer of crude oil, the sensing element 232 can be positioned in the vessel 10 in accordance with agreed petroleum industry practice with respect to the size of the vessel 10. The temperature recording means 230 is arranged to be concurrently energized with valve 64 by means of leads 234 and 236 connecting the same in parallel with the valve 64.

Proceeding now to the electrical circuitry associated with the timer 102, the reset solenoid 178 is connected in series with the switches B3 and B'2 between the power leads 80 and 82 by lead 99, switch B3, lead 238, switch B'2, lead 240, reset solenoid 178, and lead 242.

The motor 106 is connected in series with the switches B3, 148 and 172 between the power leads 80 and 82 by a circuit comprising lead 99, switch B3, lead 244, switch 148, lead 246, motor 106, lead 248, switch 172, and leads 250 and 242. The function of this circuit is to energize the motor 106 whenever the closure of switches 148 and 172 coincides with energization of the solenoid B.

The switch 158 is connected in series with the motor 106 and the switch 172 between the power leads 80 and 82 by a circuit comprising leads 202, 252, switch 158, lead 246, motor 106, lead 248, switch 172, and leads 250 and 242. The function of this circuit is to energize the motor 106 whenever the switches 158 and 172 are concurrently closed.

The switch 154 is connected between the power leads 80 and 82 by a circuit that includes lead 220, switch 68, leads 254 and 256, switch 154, lead 257, switch 78, leads 258 and 246, motor 106, lead 248, switch 172, and leads 250 and 242. The function of this circuit is to energize the motor 106 upon the coincidence of the valve 64 being closed, the switch 154 being closed by the cam segment 140, and the float switch 78 being closed.

Another circuit between the power leads 80 and 82 comprises the lead 220, the switch 68, lead 254, switch 150, lead 246, motor 106, lead 248, switch 172, and leads 250 and 242. The function of this circuit is to energize the motor 106 upon the coincidence of valve 64 being closed and the switch 150 being closed by the cam segment 136.

A downdraw valve circuit comprises leads 202 and 260, switch 152, lead 262, valve 58, and leads 264 and 210. The purpose of this circuit is to open the valve 58 whenever the switch 152 is closed by the cam segment 138.

A discharge valve circuit is connected between the power leads 80 and 82 which comprises leads 212 and 266, switch 156, lead 268, valve 66, and lead 190. The function of this circuit is to open the valve 66 when the switch 156 is closed by the cam segment 142.

An inlet valve circuit for vessel 10 is provided which comprises lead 210, valve 52, switch 60, and normally open relay switch B4 that operates in the same manner as switch B3 upon energization of solenoid B, lead 254, switch 68, and lead 220. The function of this circuit is to energize the inlet valve 52 upon the coincidence of valves 56 and 64 being closed, as well as solenoid B being energized.

The vessel 12 is provided with temperature recording means 270 operative during energization of the discharge valve thereof to record the temperature of the contents of such vessel with the sensing element 272 thereof being disposed within the vessel 12 above the inlet of the discharge conduit 32, or alternatively, positioned in accordance with industry practice as in the case of sensing element 232. The temperature recording means 270 is arranged to be concurrently energized with the valve 66 by means of leads 274 and 276 connecting such recording means in parallel with the valve 66.

Means is provided to energize the pump 38 whenever an appreciable amount of liquid is contained within the reservoir 24. Such means for energizing the pump 38 comprises the pump 38 being connected in series with a snap-action, float-actuated switch 277 between the power leads 80 and 82 by means of leads 280, 282, and 284. The switch 277 actuating mechanism can conveniently comprise an actuating rod 278 provided with spaced fixed stops that is, intermediate the stops thereof, slidably embraced by a float 279. Upon the liquid level rising to that shown at 311, the rod 278 shifts to close the switch 277, and upon the level falling to that shown at 312, the rod 278 shifts to open the switch 277.

An alarm means is provided for warning whenever the reservoir 24 approaches becoming completely full. Such means comprises an electrically actuated alarm 286 of conventional character being connected in series with a float switch 288, arranged to be closed whenever the liquid level rises above that shown at 314, between the power leads 80 and 82 by leads 290, 292, and 220.

Proceeding now to a description of the overall operation of the described apparatus, it will be assumed as an initial condition that the vessels 10 and 12 are completely empty, and that the solenoids A and B are de-energized. It will also be assumed that the timers 100 and 102 are in the positions shown thereof in the drawings, that is, in their reset positions with neither having been reset.

The measuring sequence is initiated by closing the push button switch 96 for a sufficient period of time for the solenoid B to become energized and to have closed the relay switch B1. As previously described, the solenoid B will thereafter remain continuously energized until switch 72 has been closed. Energization of solenoid B results in closure of relay switch B3 and such closure causes the solenoid B' to be energized as well as reset solenoid 178, with the latter solenoid remaining energized for a sufficient period of time to reset the timer 102 prior to the opening of delayed action relay switch B'2 as will occur under the influence of solenoid B'. Concurrently with the closing of B3, B4 is closed, and consequently the inlet valve 52 of vessel 10 is opened as switches 68 and 60 are closed. The valve 52 will remain open continuously until such time as the energization of solenoid A causes the de-energization of solenoid B, as will result when the liquid level within the vessel 10 rises sufficiently high to cause closure of the float switch 72.

With switch 172 being effectively closed due to the operation of the solenoid 178, the timer 102 commences to run as the switch 148 is closed by the cam segment 134. The timer 102 will then operate continuously through a complete cycle, that is, back to the position shown thereof in the drawing, wherein the same is awaiting being reset. The reason that the timer 102 will complete its entire cycle without interruption is that the supply of electrical energy to the timer motor 106 can be interrupted only upon the discharge valve 64 being open, the lower float switch 78 of vessel 12 being open, vessel 10 becoming filled, so as to de-energize solenoid B prior to cam segment 136 closing switch 150. None of these events will occur throughout the cycle of timer 102 as timer 100 will not commence to run until vessel 10 has filled, with the result that timer 100 cannot reach a position where cam segment 116 will close switch 130 (opening valve 64) prior to timer 102 having already progressed to the position where cam segment 142 closes switch 156 so as to halt further energization of timer 100 until switch 156 reopens. Vessel 12 is empty so that switch 78 is closed. In order that vessel 10 does not fill prior to timer 102 closing switch 150, either vessel 10 is made sufficiently large with respect to the maximum anticipated rate of supply of liquid through conduit 14, or the maximum extent to which the valve 52 can open is so selected or adjusted in relation to the pressure that liquid is supplied to the conduit 14 that the vessel 10 cannot become filled in lesser time than is required for the timer 102, operating continuously, to move from its illustrated position to that in which the switch 150 is closed by the cam segment 136. In fact, though not essential to insure continuous operation of the timer 102, the valve 52 is preferably opened, when energized, even to a lesser extent, that is only to such an extent that vessel 10 cannot fill prior to the switch 152 being closed by the cam segment 138. This limitation upon the rate of filling of vessel 10 is to prevent the inlet valve 54 of vessel 12 opening before cam segment 142 allows the switch 156 to reopen.

It will be observed that during the cycle of timer 102, the cam segments 138 and 142 through their closure of switches 152 and 156 will cause the sequential opening of valves 58 and 66. The opening of such valves during the initial cycle of timer 102 is only of indirect significance, as no liquid will have as yet been admitted to vessel 12; however, the opening of the valve 66 being accompanied by the opening of switch 70 prevents the timer 100 from progressing any farther than where the cam segment 108 allows the switch 122 to open until the cam segment 142 allows the switch 156 to reopen.

As vessel 10 will not fill prior to timer switch 152 closing, and since the cam segments 138 and 142 are so arranged that switch 156 will close prior to switch 152 reopening, vessel 12 cannot commence to fill until after switch 156 reopens. The filling of vessel 12, after the reopening of switch 156 can commence immediately or as soon thereafter as vessel 10 is filled. The duration of the reopening of switch 156 by the cam segment 142 with respect to the time remaining for completion of a cycle of the timer 102 and also, as in the case of vessel 10, with respect to either the size of vessel 12 or the maximum extent of opening of the valve 54 is such that vessel 12 cannot become filled prior to the timer 102 having completed its cycle and returned to the position thereof illustrated in the drawing awaiting being reset. Also the duration of the reopening period of switch 156 is arranged so that timer 100 will have advanced to the position where the timer switch 124 has closed, and preferably to where timer switch 126 has been closed by the cam segment 112 prior to vessel 12 becoming full so as to prevent any further introduction of liquid into vessel 10 at this time.

Considering the initial cycle of the timer 100, it will be seen that the same will be initiated upon liquid filling the vessel 10 to the level 296 so as to close the switch 72. Closure of the switch 72 causes energization of solenoid A and de-energization of solenoid B, as previously explained. Energization of solenoid A results in closure of switch A3 and momentary energization of reset solenoid 168 through the action of the solenoid A' and the time-delay relay switch A'2 to cause energization of the timer motor 104.

Upon energization of timer 100, the liquid within the vessel 10 will remain undisturbed for the length of time required for the timer 100 to advance to the position where the cam segment 112 closes the switch 126. The liquid in vessel 10 will therefore remain undisturbed a minimum predetermined time interval plus whatever time that the continuous energization of timer 100 may be interrupted due to opening of the switch 70 associated with the drain valve 66 of vessel 12. Upon the cam segment 112 closing the switch 126, the valve 56 of the downdraw conduit 26 is opened so that liquid from the vessel 10 is discharged into the reservoir vessel 24. The closure of switch 126 by cam segment 112 precedes the closure of switch 130 by cam segment 116 by a minimum predetermined time interval more than sufficient for the liquid level in the vessel 10 to have fallen from the level shown at 296 to the level indicated at 298, that is, the level of the inlet of the downdraw conduit 26.

Subsequent to the liquid level being at that shown at 298, the cam segment 116 closes the switch 130 so as to energize the discharge valve 64 to its open position, whereupon vessel 10 commences delivering a unit of volume of liquid through the conduits 30 and 34. The timer 100 will continue to be energized, except when switch 70 may be open, until the switch 124 reopens, and will thereafter remain de-energized with the switch 130 maintained in the closed position by the cam segment 116 until the liquid level within the vessel 10 has fallen to the level indicated at 300, at which time the lower float switch 74 closes. Closure of the lower float switch 74 results in re-energization of the timer 100 through the switch 128 that is closed prior to the reopening of switch 124.

Thereafter, the timer 100 will be continuously energized by virtue of the switches 74 and 128 being closed for the balance of the interval during which the switch 130 is closed by the cam segment 116. Such balance of the interval during which the cam segment 116 closes the switch 130 is important for the reason that this remaining time interval is predetermined to be at least sufficiently long in duration for the liquid within the vessel 10 to fall from the level 300 to that shown at 302, this latter level being determined by the level of the upper end of the discharge conduit 30.

Thus, it will be seen that during the total time that the discharge valve 64 is opened, a volume of liquid equal to that contained within the vessel 10 between the levels 298 and 302 is delivered through the conduits 30 and 34. The quantity of liquid thus delivered is of a predetermined precise volume defined by the internal geometry of the vessel 10 and the positions of the upper ends of the conduits 26 and 30, and constitutes a measured unit of volume of liquid delivered during each cycle of the timer 100. The temperature recording device 230, which is concurrently energized with the valve 64 provides a record whereby temperature corrections can be applied to the measured unit of volume of liquid delivered by the vessel 10. Also, such temperature record will upon examination afford an indication of the number of unit volumes delivered by the vessel 10.

Upon switch 130 reopening, the timer 100 will be continuously energized through to the end of its cycle by cam segment 118 closing the switch 132. The provision of the cam segment 118 is included for the reason that as vessel 10 will recommence filling, if vessel 12 has been filled, as soon as switch 130 reopens, the resultant opening of the switch 74 will not de-energize timer 100.

It will be recalled that the vessel 12, which commenced filling as soon as vessel 10 was filled and the switch 156 reopened, either cannot fill due to its size or is prevented from filling by the throttling action of the valve 54 until after timer 102 has returned to the position shown thereof in the drawing and preferably also until after the timer 100 has progressed sufficiently far in its cycle that the switch 126 is closed by the cam segment 112. Upon the vessel 12 filling to the level indicated at 304, the upper float switch 76 is closed with the result that solenoid B is energized and solenoid A is de-energized. This, as previously explained, results in timer 102 being reset and the timer 102 energized through the circuit that includes the switch 148.

The timer 102 will then cause the cam segment 138 to close the switch 152 after an elapse of at least a predetermined minimum period of time, which period of time will be increased for whatever length of time that the energization of the timer 102 is solely dependent upon the switch 150 being closed by the cam segment 136 and switch 130 is closed by the cam segment 116.

The cam segment 138 maintains the switch 152 closed for a sufficient length of time prior to the closure of switch 156 for the valve 58 to have reduced the liquid level within the vessel 12 to that shown at 306. Thereafter, the cam segment 142 closes the switch 156 thereby opening the discharge valve 66 so that the vessel 12 commences delivering liquid through the conduits 32 and 34. Switch 156 will remain closed for a predetermined time after the liquid level has been reduced to that shown at 308 for the reason that the timer 102 cannot be energized after the reopening of switch 150 until the lower float switch 78 has closed. The reopening of the switch 156 occurs a sufficient time interval after the reopening of switch 150 that the liquid level within the vessel 12 will have had at least ample time to have been reduced by the open valve 66 to the level shown at 310. Thus, the vessel 12 during the interval that the valve 66 is opened will have discharged a volume of liquid corresponding to that volume within the vessel between the levels 306 and 310. This predetermined volume corresponds to the measured unit of volume delivered by the vessel 10, as set forth previously. As in the case of vessel 10, the temperature recording device 270 provides a record of the temperature within the vessel 12 during the time that the valve 66 is open.

As soon as the switch 156 is reopened, the timer 102 is continuously energized to the completion of its cycle of operation due to the closure of the switch 158 by the cam segment 144. From the foregoing description of a complete cycle of operation of each of the timers, or more accurately, a complete measuring cycle of the entire apparatus delivering two unit volumes of liquid, it will be seen that the vessels 10 and 12 will thereafter alternately deliver through the common discharge conduit 34 predetermined unit volumes of liquid.

The described sequence of operations will not be changed, but only interrupted in the event of an interruption of alternating current supply to the leads 80 and 82, inasmuch as the storage battery 84 will maintain the solenoids A and B, and consequently the switches controlled thereby in the same condition throughout the interval of a power failure. As all of the valves 52, 54, 56, 58, 64, and 66 are opened only when energized from the power leads 80 and 82, a power failure can result in nothing more than a maintenance of the status quo of the measuring sequence throughout the duration of a power failure.

In its preferred form, means is provided for preventing the introduction of substandard liquid into the vessels 10 and 12. Where the apparatus is to be used for the measurement of crude oil, such means can conveniently take the form of a conventional BS&W monitor 320, such as that disclosed in U.S. Patent No. 2,720,624 issued October 11, 1955 to Gunst et al., interposed in the conduit 14 upstream of the gooseneck 50. An electrically actuated valve 322 is interposed in the conduit 14 between the gooseneck 50 and the valves 52 and 54, such valve 322 being of the same type and function as the latter valves.

The monitor 320 is connected by leads 324 and 326 to leads 80 and 82 for energization, and the valve 322 is connected by leads 328, 330, and 332 in series with the terminals 334 of the monitor 320 between the leads 80 and 82. The terminals 334 are electrically disconnected normally, it being the function of the monitor 320 to electrically bridge the terminals 334 whenever the BS&W content of the crude oil flowing therethrough is below a predetermined maximum so that the valve 322 is energized to its open position. Should the BS&W content exceed the allowed maximum, the monitor electrically disconnects the terminals 334 and the valve 322 assumes its normally closed position, so that the substandard crude oil passing through the monitor passes to the reservoir tank 24 by way of the gooseneck 50. Such substandard oil can then be removed from the tank 24 and upgraded prior to reintroduction into the conduit 14 as mentioned previously.

In the event either the vessels 10 or 12 becomes overfilled, the conduits 20 and 22 allow the excessive amount of liquid to be discharged into the reservoir vessel 24. Whenever the reservoir vessel 24 becomes filled to the level indicated at 311, the switch 277 is caused to be closed, thereby energizing the pump 38 to remove liquid from the reservoir vessel 24. The pump 38 will continue to be energized until the liquid level has been reduced to the level indicated at 312. Such removed liquid can conveniently be recirculated to the supply conduit 14 or if desired be circulated to a reprocessing or refining unit, not shown, for subsequent reintroduction into the conduit 14. If, for any reason, the pump 38 is unable to adequately remove liquid from the vessel 24, with resultant rise of liquid to the level 314 therein, the switch 288 is closed and the alarm 286 caused to be actuated thereby alerting supervisory personnel. The alarm 286 can be situated at a location remote from the reservoir vessel 24 so that there will be no need for supervisory personnel to be in the immediate vicinity of the apparatus.

Where the apparatus is to be used in conjunction with producing oil wells, it is within the scope of the invention that means can be included to curtail well production upon alarm 286 being energized. This can be conveniently accomplished in conjunction with production control apparatus of the type disclosed in application Serial No. 320,262, entitled "Fluid Production and Storage Control Apparatus," filed November 13, 1952, by Melborne L. Robertson, now Patent No. 2,779,348, by providing relay means (not shown) effective upon energization of the alarm 286 to de-energize the solenoid 398 of the said pending application, as will be clear to those skilled in the art.

The conduit 48 communicating between the reservoir vessel 24 and the conduit 14 upstream of the electrically actuated valve 322 serves to divert to the reservoir vessel 24 any excessive amount of liquid that would otherwise be delivered to the inlet valves 52 and 54. The arrangement of the gooseneck 50 with respect to the supply conduit 14 is such as to supplement the maximum opening adjustment of the valves 52 and 54 in preventing any excessive rate of supply to the vessels 10 and 12 in accordance with the previously described limitations as to the rate of filling of the vessels.

If for any reason it becomes desirable to interrupt the operation of the apparatus, this can be easily accomplished by stopping the supply of liquid to the conduit 14 and either opening the switches 94 or 98, or by shutting off the supply of electrical energy to the leads 80 and 82. Resumption of operation can be obtained by resuming the supply of liquid to conduit 14, and in the former case by also depressing whichever of the switches 94 or 98 is associated with whichever of the solenoids A or B that was energized at the time of interruption of operations, and in the latter case by also resupplying the leads 80 and 82 with energy.

The illustrated and described apparatus is sufficiently complex as to admit of a number of changes without departing from the scope of the invention.

Exemplary of such changes is the fact that the illustrated apparatus readily lends itself to the inclusion of additional elements, such as incorporating a McFarland sampler with the discharge conduit 34 for obtaining at least one sample of each unit volume of liquid measured, and the provision of recorders for various purposes. For instance, those skilled in the art can apply mechanical or electrical counting recorders to the timers 100 and 102 to record a number of cycles of operation of such timers.

The electrical control circuit illustrated and described is especially susceptible to modification without departing from the spirit of the invention. If desired, an example of such a modification can take the form of eliminating the timer reset features from the timers 100 and 102, this can be simply accomplished with respect to the timer 100 by connecting the leads 188 and 186 and eliminating the lead 228, the time-delay relay switch A'2, as well as the reset solenoid 168, the pawl 166, the switch 162 and the cam segment 160. The timer 102 would be similarly modified. Changing the timers 100 and 102 in the aforesaid manner would not basically affect the described mode of operation of the apparatus.

The reset mechanisms can be modified in themselves so that the reset solenoids 168 and 178 will be concurrently and continuously energized with the master solenoids A and B, respectively. This modification with respect to reset solenoid 168 can be made by simply removing the switch A'2 and making the lead 228 continuous. Such modification would result in the reset solenoid 168 being energized for longer intervals than essential, but would afford the advantage that vessel 10 could be filled and solenoid A energized prior to the timer 100 having completed a cycle and returned to the position shown thereof in the drawing.

Needless to say, the cams of the timers can be adjusted in a wide variety of ways. It is essential, however, that certain angular relationships between the cams be observed. With respect to the timer 100, cams 108, 110, 114, and 118 must jointly subtend the entire cycle of timer operation with cam 110 overlapping and extending after cam 108. There also must be an angular interval between cams 110 and 118 that is overlapped by cam 114. Also, cam 112 must angularly precede cam 116 with the latter angularly overlapping cam 110 and preferably also slightly overlapping cam 112 and extending to overlap cam 118. Whatever timing schedule is adopted, considering the size of the measuring vessels, desired discharge rate, total timer cycle time, etc., the schedules for both timers preferably should be identical.

The relay solenoids A' and B' are shown as being connected through the relay switches A3 and B3 to the alternating current power leads, and though such arrangement is preferred, such solenoids can be of the direct current type and connected in parallel with the solenoids A and B, respectively, inasmuch as they are to be energized concurrently therewith. Such an alternative arrangement can be preferable in circumstances where a power interruption might occur when one vessel is filling and the timer associated with the other vessel is awaiting being reset.

Though the illustrated embodiment utilizes a storage battery and a direct current circuit to insure a power failure not interrupting the sequence of operation, it is within the scope of the invention to substitute an alternating current system of mechanically held relays such as Type BXL 440 disclosed in the Allen Bradley Bulletin 770. In the event of a power failure with such a substitution each solenoid switch is fixed mechanically until released upon resumption of power by the operation of auxiliary relays, so that the sequence of operation is not affected by the power failure, as will be understood.

The illustrated embodiment of the invention is, of course, subject to the variations and ramifications illustrated in the article commencing on page 96 of the April 23, 1956, issue of the Oil and Gas Journal by Samuel H. Pope and Ross M. Stuntz, Jr., entitled "Lease Automatic Custody Transfer Becomes a Reality" without departing from the scope of the invention.

It is also within the spirit of the invention to incorporate with the measuring system a preset electrical counter for shutting in a lease when the monthly allowable has been run, as by effecting de-energization of the solenoid 398 of the previously mentioned pending Robertson application.

A further ramification of the preferred embodiment of invention can be employed where the same is utilized to measure delivery of crude oil to pipe lines as a convenience to the pipe line operators. Deliveries to pipe lines can be scheduled or limited to convenient time intervals by including clock-operated switches in the leads 194 and 254 for curtailing deliveries during selected time periods by stopping operation of the times.

One of the principal advantages of the disclosed apparatus resides in the fact that full and accurate measure is assured on each delivery of liquid from the vessels 10 and 12, since as in the case of vessel 10 the drain valve 64 is maintained open for a predetermined time after the vessel has delivered nearly all of the liquid that can be drained therefrom with valve 64 being opened. This arrangement for assuring vessel 10 draining to the level indicated at 302 gives greater certainty of vessel 10 being drained precisely to the level 302, than if a liquid level sensing device were provided to stop drainage at the level 302 for the reason that conventional liquid level sensing devices lack the desired reliability and precision. Also, the interval that cam 112 precedes cam 116 assures the liquid level being precisely at the level 298 prior to drain valve 64 opening.

The illustrated embodiment of the invention has been described in considerable detail for the purpose of conveying a full and complete understanding of the principles of the invention, and limitations as to the scope of the invention are not thereby implied; rather reference to the appended claims should be made for ascertainment of the actual scope of the invention.

We claim:

1. A process for removing liquid from a vessel to lower the liquid level therein from an upper level to a lower level through a discharge line having an inlet within the vessel at the lower level and a valve in the discharge line, comprising removing liquid from the vessel until the liquid level in the vessel is lowered from the upper level to an intermediate level between the upper and lower level and thereafter maintaining the valve in the discharge line open for a set time interval from the time the liquid level passes through the intermediate level, said time interval being sufficiently long to allow the liquid level within the vessel to drop to the level of the inlet of the discharge line.

2. The process of draining a volume of liquid from a vessel corresponding to the volume within the vessel between a top level and a lower level, comprising filling the vessel with liquid to a level spaced a fixed distance above the top level, then discharging from the vessel liquid at the top level for a predetermined-time interval sufficient for the liquid level in the vessel to fall the fixed distance, and then draining liquid from the vessel until the liquid level falls to an intermediate level spaced a predetermined height above the lower level, and thereafter continuing to drain from the vessel liquid at the lower level for a set time interval that is sufficient for the liquid level in the vessel to fall said predetermined height.

3. Apparatus comprising a vessel provided with a discharge conduit having an inlet in the vessel, a valve in the conduit, and means for discharging a sufficient volume of liquid from the vessel to lower the liquid level therein to the level of the inlet, said means comprising means for maintaining the valve open when the liquid level is above a predetermined level that is a predetermined height above the level of the inlet, and means actuated by the liquid level in the vessel passing through the predetermined level for maintaining the valve open for a predetermined-time interval after the liquid level is at the predetermined level, such time interval being at least sufficiently extended in duration to allow the liquid level to lower the predetermined height above the inlet of the discharge conduit.

4. Apparatus comprising a vessel provided with a discharge conduit having an inlet in the vessel, a valve in the conduit, and means for discharging a sufficient volume of liquid from the vessel to lower the liquid level therein to the level of the inlet, said means comprising means for maintaining the valve open when the liquid level is above a predetermined level that is a predetermined height above the level of the inlet, means actuated by the liquid level in the vessel passing through the predetermined level for maintaining the valve open for a predetermined-time interval after the liquid level is at the predetermined level, such time interval being at least sufficiently extended in duration to allow the liquid level to lower the predetermined height above the inlet of the discharge conduit, and means for closing the valve upon elapse of said interval.

5. Apparatus for discharging a volume of liquid from a vessel corresponding to the volume within the vessel between a top level and a lower level; said vessel being provided with a normally closed inlet conduit, a normally closed downdraw conduit having its inlet at the top level, a normally closed discharge conduit having its inlet at the lower level; means for opening the inlet conduit until the vessel is filled with a liquid to a level spaced a fixed distance above the top level; means for thereafter maintaining the downdraw conduit open for a predetermined-time interval sufficient for the liquid level in the vessel to fall the fixed distance, means for thereafter maintaining the discharge conduit open until the liquid level in the vessel falls to an intermediate level spaced a predetermined height above the lower level, and means for thereafter maintaining the discharge conduit open for a predetermined-time interval sufficient for the liquid level in the vessel to fall said predetermined height.

6. Liquid measuring apparatus comprising a measuring vessel provided with inlet means for filling the vessel with liquid to a predetermined top liquid level, downdraw means for discarding from the vessel a volume of liquid equal to that above a predetermined intermediate liquid level, discharge means for delivering from the vessel a volume of liquid equal to that above a predetermined lower liquid level, means including an electrical timer for sequentially and cyclically causing operation of the three named means in the order named, and means for delaying the initiation of a cyclic operation of the downdraw means for at least a predetermined-time interval after completion of a cyclic operation of the inlet means.

7. The combination of a vessel and means for discharging from the vessel a volume of liquid equal to the volume of liquid disposed therein above a predetermined liquid level, said means comprising normally closed discharge means having an inlet at said predetermined level for discharging liquid from the vessel, means for opening the discharge means, and means actuated by the liquid level in the vessel passing through a predetermined height above the inlet for maintaining the discharge means open for a predetermined-time interval after the liquid level within the vessel has been lowered to the predetermined height above said predetermined level.

8. The combination of claim 7, wherein said discharge means includes an electrically controlled valve, said means for opening the valve including an electrically actuated timer and an electric switch operated thereby, such switch being operatively coupled to the valve, and the means for maintaining the discharge means open including liquid-level-sensing means for electrically energizing the timer when the liquid level in the vessel is below the level adjacent the predetermined level.

9. Liquid measuring apparatus comprising a measuring vessel provided with inlet means for filling the vessel with liquid to a predetermined top liquid level, downdraw means for discarding from the vessel a volume of liquid equal to that above a predetermined intermediate liquid level, discharge means for delivering from the vessel a volume of liquid equal to that above a predetermined lower liquid level, and control means operatively connected to the three named means for sequentially and cyclically causing operation of the three named means in the order named, said control means including an electric timer for prolonging operation of the discharge means for a predetermined period of time after the liquid level in the vessel has been lowered by the operation of the discharge means to a level adjacent said predetermined lower liquid level.

10. The combination of claim 9, wherein said discharge means includes a discharge conduit having an inlet at the predetermined lower level and includes an electrically controlled valve in the conduit, said electric timer including an electric switch operated thereby, such switch being operatively coupled to the valve, said means for continuing operation of the discharge means including liquid-level-sensing means for electrically energizing the timer when the liquid level in the vessel is below the level adjacent the predetermined lower level.

11. Liquid measuring apparatus comprising a measuring vessel provided with inlet means for filling the vessel with liquid to a predetermined top liquid level, downdraw means for discarding from the vessel a volume of liquid equal to that above a predetermined intermediate liquid level, discharge means for delivering from the vessel a volume of liquid equal to that above a predetermined lower liquid level, control means operatively connected to the three named means for cyclically and sequentially causing operation of the three named means in the order named, said control means including an electric timer for prolonging operation of the discharge means for a predetermined period of time after the liquid level in the vessel has been lowered by the operation of the discharge means to a level adjacent said predetermined lower liquid level, and means for delaying the initiation of a cyclic operation of the downdraw means for at least a predetermined-time interval after completion of a cyclic operation of the inlet means.

12. Liquid measuring apparatus comprising a measuring vessel provided with normally closed inlet means for introducing a liquid into the same; normally closed downdraw conduit means having an inlet at a predetermined intermediate level in the vessel for removing liquid from the vessel; normally closed discharge conduit means having an inlet at a predetermined lower level in the vessel; and electrical-control means including electrical-timing means operatively connected to the three named means for cyclically opening the inlet means until the vessel is filled with a liquid to a top predetermined level, then opening the downdraw means for a predetermined-time interval that commences at least a predetermined-time interval after the vessel has been filled to the predetermined top level, and opening the discharge means after the end of the first-mentioned time interval for at least a further predetermined-time interval.

13. Liquid measuring apparatus comprising a measuring vessel provided with normally closed inlet means for introducing a liquid into the same; normally closed downdraw conduit means having an inlet at a predetermined intermediate level in the vessel for removing liquid from the vessel; normally closed discharge conduit means having an inlet at a predetermined lower level in the vessel; and electrical-control means including electrical-timing means operatively connected to the three named means for cyclically opening the inlet means until the vessel is filled with a liquid to a top predetermined level, opening the downdraw means for at least a predetermined-time interval that commences at least a predetermined-time interval after the vessel has been filled to the predetermined top level, and opening the discharge means after the end of the first-mentioned, predetermined-time interval until the liquid level in the vessel is at a predetermined level between said predetermined intermediate and lower levels and thereafter until a further predetermined-time interval has elapsed.

14. Liquid measuring apparatus comprising a pair of measuring vessels; each of said vessels being provided with a normally closed inlet valve for filling the vessel, a downdraw conduit for discarding liquid from the vessel, said downdraw conduit having an inlet at an intermediate level in the vessel and being provided with a normally closed downdraw valve, a discharge conduit for discharging liquid from the vessel, said discharge conduit having an inlet at a lower level in the vessel and being provided with a normally closed discharge valve; a normally energized, electrically driven, cyclically operating timer means operatively connected to each of said vessels, means effective during a first portion of each cycle of operation of one of the timer means to open the downdraw valve of one of said vessels, means effective during a second portion of each cycle of said one timer means to open the discharge valve of said one vessel, and also for de-energizing the other timer means, means effective to open the inlet valve of said one vessel after the second portion of the timer means cycle until said one vessel has been filled with liquid to a predetermined top level, and means effectively preventing electrical energization of said one timer means at the end of each cycle until said one vessel has been filled to a predetermined top level.

15. The combination of claim 14, wherein the beginning of the first portion of the timer cycle is delayed a predetermined-time interval after the beginning of a timer cycle.

16. The combination of claim 15, including means for de-energizing the timer means during an intermediate part of the second portion of the timer cycle whenever the liquid level in the vessel is above a level that is spaced a predetermined height above the lower level.

17. The combination of claim 14 including means for de-energizing the timer means during an intermediate part of the second portion of the timer cycle whenever the liquid level in the vessel is above a level that is spaced a predetermined height above the lower level.

18. Liquid measuring apparatus comprising a pair of measuring vessels; each of said vessels being provided with a normally closed inlet valve for filling the vessel, a downdraw conduit for discarding liquid from the vessel, said downdraw conduit having an inlet at an intermediate level in the vessel and being provided with a normally closed downdraw valve, a discharge conduit for delivering liquid from the vessel, said discharge conduit having an inlet at a lower level in the vessel and being provided with a normally closed discharge valve; a normally energized, electrically driven, cyclically operating timer means operatively connected to each of said vessels, means effective during a first portion of each cycle of operation of one of the timer means to open the downdraw valve of one of said vessels, means effective during a second portion of each cycle of said one of the timer means to open the discharge valve of said one vessel, means effective to open the inlet valve of said one vessel subsequent to the second portion of said one timer means cycle until the vessel has been filled with the liquid to a predetermined top level, means effectively preventing electrical energization of said one timer means at the end of each cycle until said one vessel has been filled to a predetermined top level, and means for preventing the inlet valves being concurrently open.

19. The combination of claim 18, wherein the beginning of the first portion of the timer cycle is delayed a predetermined-time interval after the beginning of a timer cycle.

20. The combination of claim 19, including means effectively de-energizing the timer means during an intermediate part of the second portion of the timer cycle whenever the liquid level in the vessel is above a level that is spaced a predetermined height above the lower level.

21. The combination of claim 18, including means effectively de-energizing the timer means during an intermediate part of the second portion of the timer cycle whenever the liquid level in the vessel is above a level that is spaced a predetermined height above the lower level.

22. Liquid measuring apparatus comprising a pair of measuring vessels; each of said vessels being provided with a normally closed inlet valve for filling the vessel, a downdraw conduit for discarding liquid from the vessel, said downdraw conduit having an inlet at an intermediate level in the vessel and being provided with a normally closed downdraw valve, a discharge conduit for delivering liquid from the vessel, said discharge conduit having an inlet at a lower level in the vessel and being provided with a normally closed discharge valve; a normally energized, electrically driven, cyclically operating timer means operatively connected to each of said vessels, means effective during a first portion of each cycle of operation of one of the timer means to open the downdraw valve of one of said vessels, means effective during a second portion of each cycle of said one timer means to open the discharge valve of said one vessel and also for de-energizing the other timer means, means effective to open the inlet valve of said one vessel subsequent to the second portion of the timer means cycle until said one vessel has been filled with the liquid to a predetermined top level, means effectively preventing electrical energization of said one timer means at the start of each cycle until said one vessel has been filled to a predetermined top level, and means for preventing the inlet valves being concurrently open.

23. Liquid measuring apparatus comprising a pair of liquid measuring vessels; each of said vessels being provided with a normally closed inlet valve for filling the vessel, a downdraw conduit for discarding liquid from the vessel, said downdraw conduit having an inlet at an intermediate level in the vessel and being provided with a normally closed downdraw valve, a discharge conduit for delivering liquid from the vessel, said discharge conduit having an inlet at a lower level in the vessel and being provided with a normally closed discharge valve; an electrically driven, cyclically operating timer means operatively connected to each of said vessels, means effective during a first portion of each cycle of operation of one of timer means to open the downdraw valve of one of the vessels, means effective during a second portion of each cycle of said one timer means to open the discharge valve of said one vessel; a control means operatively connected to each of the vessels; means for causing each one of the control means to be continuously effective solely during the time interval from the filling of the vessel connected thereto to a predetermined top level until the other vessel has filled to a predetermined top level; means for opening the inlet valve of each vessel during the concurrence of the downdraw valve and the discharge valve of such vessel being closed together with the control means connected to the other vessel being effective; means effective during said second portion of each timer means cycle to interrupt energization of the other timer means.

24. The combination of claim 23 including means effectively interrupting the energization of each timer means during said second portion of its cycle until the liquid level in the vessel connected thereto is closely spaced above the inlet of the discharge conduit of such vessel.

25. The combination of claim 23 including means operative to energize each timer means at the start of its cycle solely during the effectiveness of the control means connected to the same vessel as such timer means.

26. The combination of claim 23 including means for limiting the rate of filling of each vessel to a value that will not fill the vessel prior to the end of a cycle of the timer means connected thereto.

27. The combination of claim 23, wherein the first and second portions of each cycle overlap.

28. The combination of claim 23, including means for limiting the rate of filling of each vessel to a value that will not fill one of the vessels until after the timer means connected to the other vessel has advanced to at least the beginning of the first portion of its cycle.

29. The combination of claim 23, including a reservoir connected to the downdraw conduits, and means for removing liquid from the reservoir.

30. Liquid measuring apparatus comprising a pair of measuring vessels; each of such vessels being provided with a normally closed, electrically operated inlet valve that is open solely during energization thereof, a downdraw conduit having an inlet at an intermediate level in the vessel, such downdraw conduit being provided with a normally closed, electrically operated valve that is open solely during energization thereof, a discharge conduit having its inlet at a lower level in the vessel, said discharge conduit being provided with a normally closed, electrically operated valve that is open solely during energization thereof, said downdraw valve and said discharge valve each being provided with an electric switch arranged to open and close concurrently therewith, a liquid level responsive electric switch arranged to be closed whenever the liquid level within the vessel is below a predetermined position between the inlets of the downdraw and the discharge conduits; a pair of normally open electrical control switches operatively connected to each of the vessels, a control means effective upon either of the vessels becoming filled with a liquid to a level spaced a predetermined height above the inlet of the downdraw conduit to maintain the pair of control switches connected to such vessel continuously closed until the other vessel has become filled with a liquid to a corresponding level; an electrically driven, cyclically operating timer means operatively connected to each of said vessels, each of said timer means including first, second, third, and fourth timer switches that are normally open and are arranged to be closed during predetermined portions of the cycle of the timer means, the portion of the cycle that the first switch is closed preceding and being spaced from the portion of the cycle that the third switch is closed with the portion of the cycle that the second switch is closed overlapping the portions of the cycle that the first and third switches are closed, the portion of the cycle during which the fourth switch is closed succeeds and is spaced from the portion of the cycle that the second switch is closed while overlapping the portion of the cycle that the third switch is closed, a source of electrical energy for driving the timer means, each of the aforementioned timer switches being connected in series between the source of electrical energy and the timer means for controlling energization of the latter with such switches being connected in electrical parallel with respect to each other, said first timer switch being connected in electrical series with one of the pair of control switches connected to the same vessel, said second and third timer switches being connected in series with the switch connected to the discharge valve of the other vessel, said third timer switch also being connected in series with the liquid-level-responsive switch, the other of such pair of control switches connected to the same vessel being connected in electrical series with the inlet valve and the switches of the discharge valve and the downdraw valve of the other vessel, said timer means also including fifth and sixth timer switches that are normally open and which are arranged to be successively closed for predetermined overlapping portions of the timer cycle, with the portion of the cycle during which the sixth switch is closed overlapping and trailing the portions of the cylce during which the second switch is closed, said fifth timer switch being arranged in electrical series with the valve of the downdraw conduit of the same vessel for controlling energization thereof, said sixth timer switch being arranged in electrical series with the valve of the discharge conduit of the same vessel for controlling energization thereof.

References Cited in the file of this patent

UNITED STATES PATENTS

| | | |
|---|---|---|
| 1,665,093 | Gouvion | Apr. 3, 1928 |
| 1,691,070 | Hurlbrink | Nov. 13, 1928 |
| 1,699,562 | Courtioux | Jan. 22, 1929 |
| 1,740,875 | Porte | Dec. 24, 1929 |

FOREIGN PATENTS

| | | |
|---|---|---|
| 765,258 | France | Mar. 19, 1934 |

OTHER REFERENCES

Publication: "How Production Controls Work" by L. M. Hubby, Oil and Gas Journal, March 1956, pages 94-97.

Publication, "How Shell Designs An Automatic Lease," by D. C. Meyers, Oil and Gas Journal, Oct. 17, 1955, pages 111-117.